United States Patent [19]

Okajima et al.

[11] Patent Number: 4,942,526

[45] Date of Patent: Jul. 17, 1990

[54] METHOD AND SYSTEM FOR GENERATING LEXICON OF COOCCURRENCE RELATIONS IN NATURAL LANGUAGE

[75] Inventors: Atsushi Okajima, Yokohama; Fumiyuki Yamano, Kawasaki; Eri Katagiri, Yokohama, all of Japan

[73] Assignee: Hitachi, Ltd., Tokyo, Japan

[21] Appl. No.: 922,889

[22] Filed: Oct. 24, 1986

[30] Foreign Application Priority Data

Oct. 25, 1985 [JP] Japan .................. 60-239779

[51] Int. Cl.⁵ .................................. G06F 15/38
[52] U.S. Cl. ...................................... 364/419
[58] Field of Search ................ 364/300, 200, 419

[56] References Cited

U.S. PATENT DOCUMENTS

| | | | |
|---|---|---|---|
| 4,502,128 | 2/1985 | Okajima et al. | 364/900 |
| 4,586,160 | 4/1986 | Amano et al. | 364/900 |
| 4,641,264 | 2/1987 | Nitta et al. | 364/419 |
| 4,654,798 | 3/1987 | Taki et al. | 364/419 |
| 4,654,875 | 3/1987 | Srihari et al. | 382/40 |
| 4,661,924 | 4/1987 | Okamoto et al. | 364/419 |
| 4,688,195 | 8/1987 | Thompson et al. | 364/300 |
| 4,703,425 | 10/1987 | Muraki | 364/419 |
| 4,733,009 | 9/1988 | Kucera et al. | 364/419 |
| 4,744,050 | 5/1988 | Hirosawa et al. | 364/419 |

FOREIGN PATENT DOCUMENTS

| | | | |
|---|---|---|---|
| 0183469 | 10/1984 | Japan | 364/419 |
| 0200368 | 10/1985 | Japan | 364/419 |
| 0003267 | 1/1986 | Japan | 364/419 |
| 0009758 | 1/1986 | Japan | 364/419 |
| 0188684 | 8/1986 | Japan | 382/40 |

OTHER PUBLICATIONS

William A. Woods, "What's important about knowledge representation?", IEEE Computer, Oct. 1983, pp. 22-27.

Schubert et al., "Determining Type, Part, Color, and Time Relationship", IEEE Computer, Oct. 1983, pp. 53-60.

*Primary Examiner*—Andrew J. James
*Assistant Examiner*—Viet Q. Nguyen
*Attorney, Agent, or Firm*—Antonelli, Terry, Stout & Kraus

[57] ABSTRACT

A method and an apparatus for generating/maintaining automatically or interactively a lexicon for storing information of cooccurrence relations utilized for determining whether or not a sequence of words in a given sentence described in a natural language is semantically correct with the aid of a memory, a data processor and a textual sentence file. A hypothesized cooccurrence relation table for storing hypothesized cooccurrence relations each having a high probabliity of being a valid cooccurrence relation is prepared by consulting the file. A hypothesis for the cooccurrence relation is previously established on the basis of a cooccurrence relation pattern indicating a probably acceptable conjunction by consulting the hypothesized cooccurrence relation table. Subsequently, a corresponding actual cooccurrence relation is derived from the textual file by parsing the relevant textual sentence and is tested to determine whether the cooccurrence relation is valid or not with reference to predetermined threshold conditions. On the basis of the results of the test, the information of the cooccurrence relation is correspondingly modified. The present method and apparatus can be utilized in a natural language parsing system and a machine translation system.

13 Claims, 4 Drawing Sheets

| NUMBER | COOCCURRENCE RELATION PATTERN | | | LANGUAGE | |
|---|---|---|---|---|---|
| 1 | VERB | OBJECT | | COMMON TO BOTH | ~42 |
| 2 | ADVERB | VERB | | COMMON TO BOTH | |
| 3 | SUBJECT | GOVERNOR (VERB) | | COMMON TO BOTH | |
| ⋮ | --- | --- | | | |
| 50 | ADVERB | AUXILIARY SUFFIX | | JAPANESE | |
| 51 | VERB | PREPOSITION | PREPOSITIONAL COMPLEMENT | EUROPO-AMERICAN LANGUAGES | |

FIG. 5

| PATTERN NUMBER | COOCCURRENCE RELATION PATTERN | | NUMBER OF OCCURRENCES OR PROBABILITY | CORRESPONDING TARGET WORD | |
|---|---|---|---|---|---|
| 1 | hi ku | ka ze (COLD) | 157 | CATCH | ~45 |
| 1 | hi ku | ko me (RICE) | 72 | GRIND | |
| 1 | hi ku | ma me (BEAN) | 30 | GRIND | |
| 1 | hi ku | pi a no (PIANO) | 15 | PLAY | |
| 1 | hi ku | chū i (ATTENTION) | 23 | ATTRACT | |
| 1 | hi ku | ji sho (DICTIONARY) | 53 | CONSULT | |

FIG. 6

| PATTERN NUMBER | COOCCURRENCE RELATION PATTERN | | | NUMBER OF OCCUR- RENCES OR PROBABILITY |
|---|---|---|---|---|
| 1 | hi ku (GRIND) | ko ku ru i (GRAIN) | | 102 |
| 1 | hi ku (CATCH) | ka ze (COLD) | | 157 |
| 2 | ge n ki ni (ACTIVELY) | VERB OF ACTION | | 320 |
| 3 | ne da n (PRICE) | a ga ru (RISE) | | 111 |
| 3 | ke n ti ku bu tu (BUILDING) | ta tu (BUILD) | | 350 |
| 3 | cho ru i (BIRDS) | to bu (FLY) | | 410 |
| ⋮ | --- | --- | . | |
| 50 | ze n ze n (AT ALL) | na i (NOT) | | 350 |
| 51 | VERB(S) OF TRANSFER | TO | PLACE | 520 |

METHOD AND SYSTEM FOR GENERATING LEXICON OF COOCCURRENCE RELATIONS IN NATURAL LANGUAGE

BACKGROUND OF THE INVENTION

The present invention generally relates to a method and system for generating a lexicon of cooccurrence relations in a natural language. More particularly, the present invention concerns technology for generating and maintaining a cooccurrence relation lexicon describing cooccurrence relations among words, phrases and others and which can be utilized not only in a natural language parsing system for analyzing sentences or clauses described in a natural language but also in a translation system for performing translation between different natural languages on the basis of the results of the parsing.

As apparatus and systems for parsing sentences and clauses described in a natural language and making use of the results of the parsing for translation or for other purposes, there have heretofore been developed a question-answer system, an automatic indexing system and a machine translation system which can operate on the natural languages. In the field of this technology, the main theme of studies has been the parsing for recognition of sentences or clauses. In a simple form of the parsing, a template sentence or a semi-template sentence which corresponds to a template sentence having a variable such as, for example, "PLEASE GIVE ME * TICKETS" (where * represents a variable indicating the number of tickets in this example) is collated with an input sentence, wherein detection of coincidence between the template or semi-template sentence and the input sentence allows an output sentence such as "INPUT SENTENCE COULD BE RECOGNIZED" to be issued. In the syntactic analysis in which a more general parsing method is adopted, the subject, predicate, modifying phrase and others which constitute a sentence are recognized.

In the syntactic analysis mentioned above, difficulty is encountered in parsing a partial blank sentence having a blank portion to be filled such as, for example, "SOMEBODY SAID THAT . . . ". Similarly, in the parsing of a sentence containing a plurality of modifiers, it is extremely difficult to find out what a word, phrase or clause in concern modifies. In conjunction with the parsing of an English sentence, for example, it is known that a sentence composed of a subject, a predicate and an object allows five alternatives to run candidates for the parsed sentence with addition of two prepositions and as many as fourteen alternatives with three prepositions. For avoiding the ambiguity as involved, it has been proposed that semantic restrictions should be imposed on the parsing. By way of example, consider a phrase "A BUILDING OF WHITE WALL STANDING BY A LAKE". This phrase may be syntactically analyzed into a string of words "WHITE WALL STANDS BY A LAKE" and a word "BUILDING" attached thereto as one hypothesis. To exclude such hypothesis, a semantic restriction rule to the effect that "MATERIAL (white wall) OF 'OF MATERIAL' CAN NOT BE THE SUBJECT OF THE POSSESSIVE CASE" or alternatively a word-based selectional (restriction) rule to the effect that "WHITE WALL CAN NOT STAND" but "BUILDING CAN STAND" may be established. Under the restriction, the above phrase can be syntactically interpreted or analyzed to read "(BUILDING OF WHITE WALL) STANDING (BY A LAKE)".

In this concentration, it is observed that a certain word occurs in a certain sentence together with another certain word in a certain relationship with a high probability or high frequency. In that case, it can be said that both words share cooccurrence relation with each other. As instances exemplifying the cooccurrence relation, there may be mentioned English idioms such as "TAKE A BATH", the government of prepositions by verbs typified by "GET OUT", the adverbial concord or collocation such as ". . . NOT . . . AT ALL", and others. As literatures describing linguistically these cooccurrence relations in detail, there exist dictionaries of collocations. For example, reference may be made to S. Katsumata's "Kenkyusha's New Dictionary Of English Collocations" (1958, Second Edition) and "Longman Dictionary of English Idioms". These dictionaries are however destined for use by those people having knowledge and experience in the various fields in addition to the linguistics. Further, these dictionaries simply enumerate fragmentary instances in accordance with a certain sequence. In other words, the dictionaries can not be straightforwardly utilized for setting up rules useful in the syntactic analysis or parsing.

With a view toward making the linguistic knowledgeable to be utilized in machine processing such as parsing, formatting the knowledge in the form of tables and rules has been developed and proposed. Further, as an aid to this end, a method for analyzing or extracting the cooccurrence relations is proposed according to which a set of sentences each including a word in concern are outputted in the form of a list to determine or check how the word in concern is used in the sentences. Such method is known as a KWIC (Key Word in Context) method. However, even with the aid of the KWIC method, a test as to whether the restriction rules and grammar are observed can not be made without resorting to the user's judgment.

In conjunction with the procedure or regulating the cooccurrence relations for utilization in syntactic analysis or parsing, it is required to determine previously what types of cooccurrence relations are to be set up (usually tabulated) or where and how a given cooccurrence relation is made use of in the course of the parsing. As a consequence, the parsing process assumes a fixed routine lacking in flexibility and giving rise to problems. Further, because data or information of the cooccurrence relations is only available through the medium of the record tables, there may occur such a situation in which information required for a given parsing can not be available. In that case, preparation of information requisite for establishment of new cooccurrence relations as well as addition/deletion and modification of the cooccurrence relation table must rely on man power, which requires a number of laborious processing steps.

As the known literature concerning the machine translation in which a lexicon of cooccurrence relations is made use of, there may be mentioned, for example, Muraki et al "Semantic Processing in Machine Translation System Using PROLOG" contained in "Natural Language Processing Study Reports 33-5" published by Information Processing Society of Japan (Oct. 22, 1982) and Pierre Isabelle et al "TAUM-AVIATION: Its Technical Features" in Computational Linguistics, Vol. 11, No. 1, January-March 1985, pp. +18.

SUMMARY OF THE INVENTION

An object of the present invention is to solve the problems described above and to provide a method and a system capable of automatically generating a lexicon of cooccurrence relations.

Another object of the present invention is to provide a method and an apparatus or system for ensuring maintenance of a lexicon containing cooccurrence relations in a natural language such that adding information of cooccurrence relations to the lexicon as well as modifying the contents thereof, while reducing the dependency on man power.

It is a further object of the present invention to provide a cooccurrence relation lexicon generating/maintaining method and apparatus for a system for performing machine translation and analysis of natural languages by using a lexicon of cooccurrence relations, which method and apparatus allow addition and deletion of information relating to cooccurrence relations to the lexicon as well as modification of the contents thereof to be executed with improved efficiency while reducing interactive procedure or work for an operator.

In view of the above objects, according to an aspect of the present invention a method and an apparatus for generating/maintaining a lexicon of cooccurrence relations is provided, in which a memory is used for storing information or data of cooccurrence relations utilized for determining whether or not a sequence of words in a given sentence described in a natural language is semantically correct, and in which a hypothesized cooccurrence relation table listing hypothesized cooccurrence relations is prepared and stored in the memory, wherein a cooccurrence relation is previously hypothesized on the basis of a cooccurrence relation pattern indicating a probably acceptable combination by referring to or consulting the hypothesized cooccurrence relation table, being then followed by derivation of a corresponding actual cooccurrence relation from a text corpus through the parsing to thereby determine whether the hypothesized cooccurrence relation is correct or not using a predetermined threshold, whereby the information of the cooccurrence relation is generated in accordance with the result of the decision.

The generation of information of the cooccurrence relation is performed in a fully automated manner under the control of a program or alternatively through man-machine interactive procedures. The information of cooccurrence relation thus generated is registered in the lexicon of the cooccurrence relations when the information satisfies requirements or conditions established for the registration, whereby addition/deletion and modification of the lexicon contents are efficiently accomplished.

DESCRIPTION OF THE PREFERRED EMBODIMENTS

Now, the invention will be described in detail in conjunction with exemplary embodiments thereof by referring to the accompanying drawings.

In the first place, description is directed to the principle and the basic concept of the invention.

In a natural language parsing system or machine translation system, a text corpus including a collection of sentences and clauses subjected to the parsing (or syntactic analysis) as well as those belonging to the same category of the same field is prepared together with a table listing cooccurrence relations which are required as grammar (or a set of grammatical rules) for analyzing the sentences. By examining the textual sentence by consulting the cooccurrence relation table, the valid cooccurrence relation is extracted from the table and used for the generation of a cooccurrence relation lexicon together with a set of words or the like for which the extracted cooccurrence relation applies valid. In this way, analysis and generation of a natural language of high quality is made possible, while facilitating the creation or generation of the cooccurrence relation lexicon itself.

Figure 2:
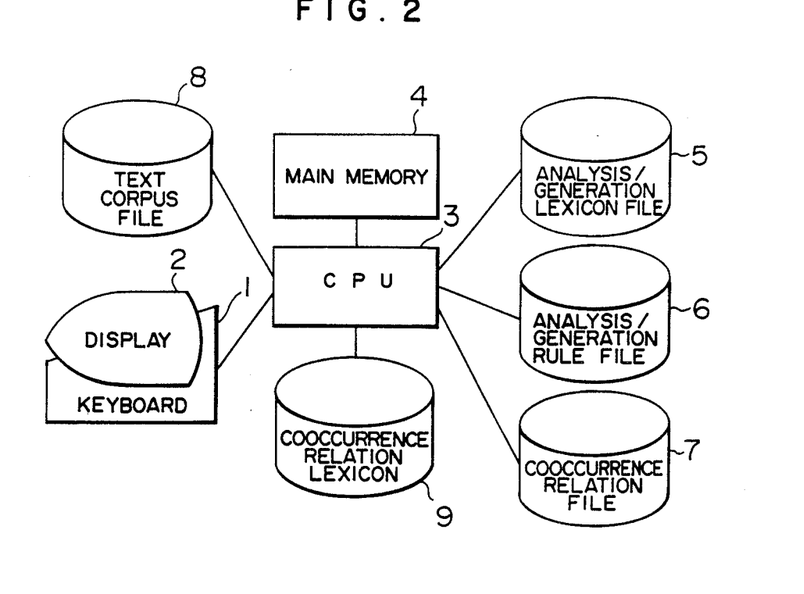
FIG. 2 is a view showing in a block diagram a general arrangement of a cooccurrence relation data generating/maintaining system according to an embodiment of the invention.

FIG. 2 shows in a block diagram a general arrangement of a cooccurrence relation lexicon generating/maintaining system according to an embodiment of the present invention.

In FIG. 2, a reference numeral 1 denotes an input keyboard through which a user can perform confirmation and judgment on the cooccurrence relations interactively with the lexicon generating/maintaining system, 2 denotes a display unit for visually indicating required data as well as promptings to the user, 3 denotes a central processing unit or CPU, 4 denotes a main memory for storing various information or data, 5 denotes a lexicon file storing the data requisite for performing analysis/generation, 6 denotes a analysis/generation rule file storing rules requisite for the analysis/generation, 7 denotes a cooccurrence relation file storing a table listing the cooccurrence relations to be utilized for the analysis/generation, 8 denotes a text corpus file storing a collection of textual sentences in general or specific to a particular field which sentences preferably amount to 30,000 or more in number, the text corpus file being imparted with a learning capability, and finally a numeral 9 denotes a lexicon of cooccurrence relations for storing cooccurrence relation data or information prepared by examining or analyzing the textual sentences stored in the text corpus file.

Figure 3:
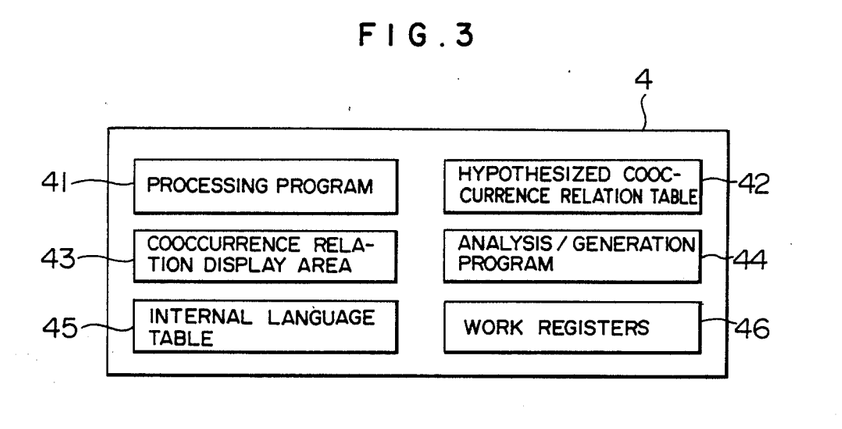
FIG. 3 is a view for illustrating allocation of a main memory employed in the system shown in FIG. 2.

FIG. 3 is a view illustrating allocation of the main memory 4 shown in FIG. 2.

As will be seen in FIG. 3, the main memory 4 includes an area for storing a processing program 41 for executing algorithms requisite for generation and maintenance of the cooccurrence relation lexicon, a hypothesized cooccurrence relation table 42 for storing cooccurrence relations hypothesized by referring to and consulting the cooccurrence relation file 7, a cooccurrence relation display data area 43 for storing the contents to be displayed on the display device 2 to thereby prompt the user's decision when a textual sentence contradicting the hypothesized cooccurrence relations is encountered, an analysis/generation program area 44 for determining through the syntactic analysis/generation procedure with the aid of the actually established analysis/generation rules and the lexicon how a word constituting a term of a hypothesized cooccurrence to be created or examined (when the term is a category code, the word included in the category code) is used in a textual sentence stored in the text corpus file 8, an internal language (or interlingua) table 45 for holding the internal processes through which a textual sentence is analyzed/generated, and work registers 46 for storing temporary data during the course of hypothesization, test and syntactic analysis/generation in accordance with the processing program.

Next, description will be made of the operation of the system according to the illustrated embodiment of the invention.

When a user desires to determine a pair of a mode of expression and a target/translated expression peculiar to a particular field through the parsing or translation of a sentence used in that field, he or she first activates the processing program 41 through the keyboard 1. To this end, a start key may be provided on the keyboard. Additionally, when a pair of new language and literature belonging to a new field are to undergo translation in the machine translation or when the text corpus file is to be modified or corrected periodically as with the case of the text corpus file containing the textual sentences used in newspapers, periodicals and the like, the processing program 41 can be activated manually under the instruction of the user or automatically under the instruction issued periodically at a predetermined time interval.

Figure 1:
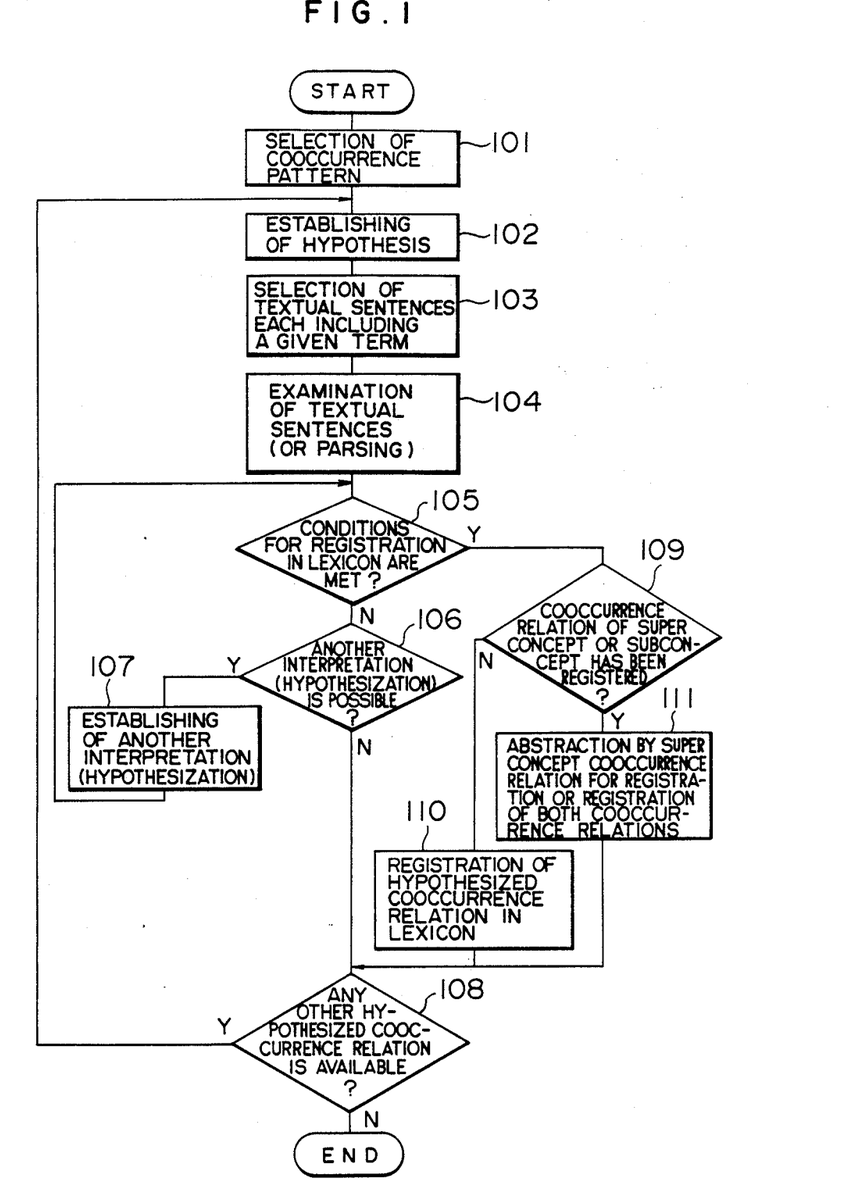
FIG. 1 is a view illustrating in a flow chart an exemplary embodiment of the present invention.

The processing operation executed by the processing program 41 is illustrated in a flow chart in FIG. 1 which is referred to in the following description.

Figure 4:
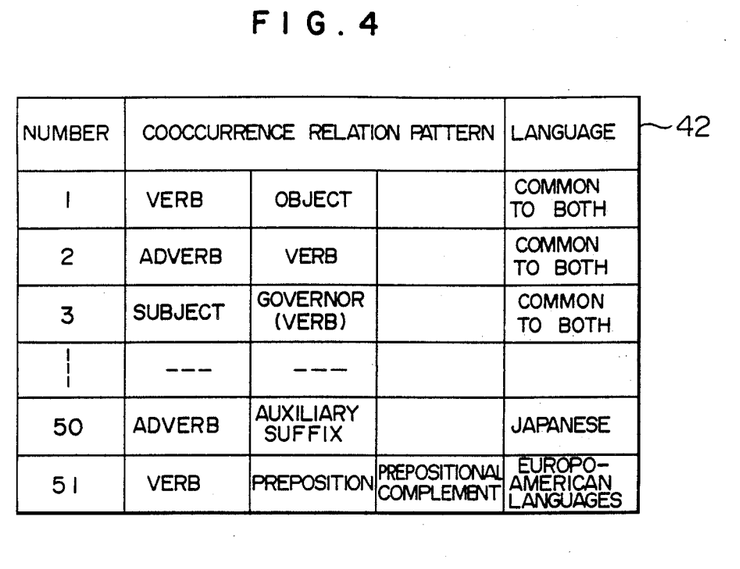
FIG. 4 is a view showing an example of the contents of a cooccurrence relation file employed in the system shown in FIG. 2.

Upon activation of the processing program 41, a probably acceptable cooccurrence relation pattern is first selected from a cooccurrence relation table stored in the file 7 (step 101). In the case of the automatically activated processing mentioned above, different levels of priority may be assigned to cooccurrence relation patterns at the time of generating or creating the cooccurrence relation table for pattern selection. The selected pattern includes a portion depending on the language and a portion depending on a tree diagram of a sentence (or internal language) subjected to the parsing. An example of the language-dependency (or an example of the contents of the cooccurrence relation table contained in the file 7 shown in FIG. 2) is illustrated in FIG. 4. Referring to the Figure, the cooccurrence relation patterns such as "VERB AND OBJECT" and "ADVERB AND GOVERNOR (VERB)" can be seen in substantially all varieties of languages. In contrast, the cooccurrence relation patterns such as, for example, "FUKUSHI AND JODOSHI-GOBI (adverb and auxiliary suffix in Japanese e.g. "ze n ze n ... na i", "VERB, PREPOSITION AND PREPOSITIONAL COMPLEMENT (in Europo-American languages)", and PHRASAL VERB e.g. "give up" can be regarded as the natural-language-dependent cooccurrence relation patterns. In any case, the cooccurrence relation bears a relationship to the syntactic analysis/generation rules in respect that (1) the cooccurrence relation represents the relation between or among the terms of internal language being subjected to the parsing, and (2) the cooccurrence relation can be made use of for eliminating ambiguity and/or outputting of an idiomatic translation.

The selection of the cooccurrence relation pattern (i.e. the cooccurrence relation pattern setting-up step 101) can of course be executed in response to a corresponding instruction issued through interactive procedure with the user. At this step, a list or table contained in the cooccurrence relation file 7 as illustrated in FIG. 4 is stored in the cooccurrence relation display data area 43 in accordance with the processing program 41 to thereby allow alternative candidates for the concerned cooccurrence relation to be displayed on the display device 2 so that the user can select one of the candidates. Alternatively, a candidate for the cooccurrence relation which the user desires to confirm may be set up under the instruction of the user.

When the candidate for cooccurrence relation is determined as described above, the candidate is stored in the hypothesized cooccurrence relation table 42 from the cooccurrence relation file 7 or through the keyboard 1. Subsequently, the processing program 41 determines whether the candidate by itself can be a hypothesized cooccurrence relation or is to be further restricted spontaneously or through interaction with the user to thereby establish the hypothesized cooccurrence relation for the target (step 102). By way of example, it is assumed that as a candidate for the cooccurrence relation "VERB AND OBJECT", a cooccurrence relation "VERB (=hi ku in Japanese) AND OBJECT" is hypothesized, whereupon usage of the words capable of constituting the object for the verb "hi ku (in Japanese)" is checked. As another example, a cooccurrence relation "VERB AND OBJECT (=ne dan in Japanese) is hypothesized. In that case, usage of the verbs which can take "ne dan" as the object thereof is checked. This procedure is referred to as the processing for establishing the hypothesis (i.e. hypothesized cooccurrence relation).

It should be mentioned here that some cooccurrence relations do not require the parsing mentioned above. By way of example, when a cooccurrence relation "If a certain noun is used in a specific target (translated) word peculiar to a certain field" is to be examined, no parsing in the strict sense is required. In this case, a source sentence and target/translated sentences are collated with each other to thereby select the target word used in the concerned field from a number of permissible candidate target words. Alternatively, instead of hypothesizing the target words, those target/-translated sentences having words common to them are collected in a set, whereby one or two words making appearance in the collected sentences at a high frequency may be selected as the target word(s). In general, a word such as a technical term can have more than one target words in dependence on the technical field where the word is used. In that case, the first mentioned procedure, i.e. collation of the source sentence with the target sentences may be adopted to determine the target word pertinent to the concerned field without resorting to the parsing.

When the hypothesized cooccurrence relation to be tested is determined, as described hereinbefore, a certain term included in the hypothesized cooccurrence relation is picked up and textual sentences including that term are selected (step 103). For example, in the case of the cooccurrence relation "VERB (=hi ku in Japanese) AND OBJECT", the verb "hi ku" (in Japanese) is picked up to extract the textual sentences having that word "hi ku" from the text corpus file 8. As a consequence, the space to be searched upon subsequent tests can be reduced.

Figure 5:
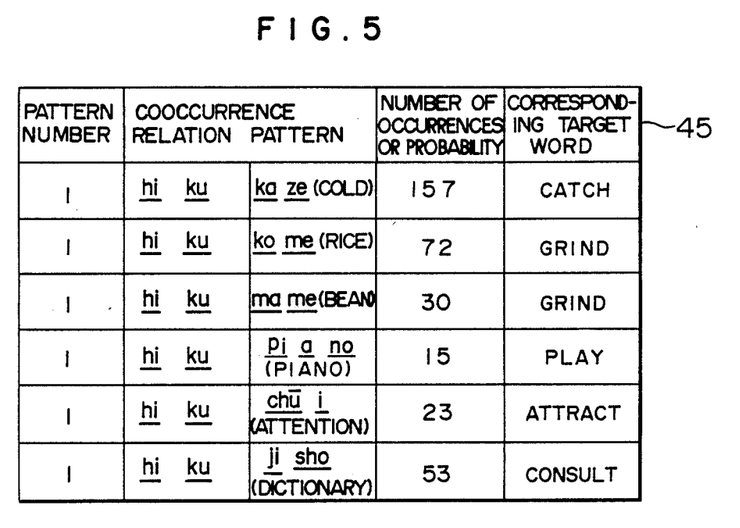
FIG. 5 is a view illustrating an example of the results obtained through a test of a hypothesized cooccurrence relation performed by consulting a text corpus file.

Next, each of the extracted or selected textual sentences is tested through the parsing procedure as to whether the hypothesized cooccurrence relation applies valid or not (step 104). In this case, when parts of speech and syntactic roles (noun, particle, subject, object or the like) are included as the terms of the cooccurrence relation, the analysis/generation program 44 is activated, whereby the parsing is performed by consulting the analysis/generation lexicon file 5 and the analysis/generation rule file 6, the results of the parsing being stored in the internal language table 45. For executing this processing, various known methods may be used. Accordingly, any further description in this respect will be unneccessary. For particulars, reference may be made, for example, U.S. application Ser. No. 415,601, filed Sept. 7, 1982, now U.S. Pat. No. 4,641,264, entitled "Method For Automatic Translation Between Natural Languages". The disclosure of this referenced U.S. patent is incorporated by reference in the present application. Taking as an example the cooccurrence relation "VERB (=hi ku in Japanese) AND OBJECT", the textual sentences in which the verb "hi ku" appears are parsed. On the basis of the result of the parsing, the words which can be the object for the verb "hi ku" are collected. An example of the results of this processing is illustrated in FIG. 5. If the result of the parsing of the cooccurrence relation is to be utilized in a machine translation, the target/translated sentence is further parsed to test also the target words. FIG. 5 shows examples of the cooccurrence relation in which the target/translated words of the verbs can be definitely determined, respectively. When a word is polysemic, there arises the possibility of the semantic restriction becoming severe.

Now, the processing program 41 determines whether or not the result obtained through the processing mentioned above is to be registered in the cooccurrence relation lexicon 9 (step 105). This decision may be made, for example, in dependence on the number of occurrences of the same cooccorrence relation from the text corpus file or in consideration of dispersion among the rows of the table shown in FIG. 5, i.e. the number of the objective words of the same species and category (this step corresponds to a step 111 described below). It should be mentioned that a prerequisite for this decision resides in that a sufficient number of the textual sentences are available to ensure the significance of occurrence of the cooccurrence relation pattern. The threshold with the reference to which decision for the registration is made can be empirically determined, by for example, a rate of occurrences of a pattern being 10% of 10 times, as exemplified in FIG. 5. The threshold may be varied or weighted as per the statistic processing result. Of the terms included in the hypothesized cooccurrence relation, the syntactic role such as "OBJECT" is not registered in the cooccurrence relation lexicon 9 but interpreted or considered to be temporally available for creating a hypothesized cooccurrence relation including as a term thereof a word or category code meeting that syntactic role. More specifically, the hypothesized cooccurrence relation "VERB (=hi ku in Japanese) AND OBJECT" is a so-called preliminarily hypothesized cooccurrence relation. Accordingly, when the words serving as the object are collected as shown in FIG. 5, it is then tested whether or not another interpretation (which may be considered equivalent to another hypothesized cooccurrence relation) of the hypothesized cooccurrence relation is possible (step 106).

As a further alternative, each of the rows of the table shown in FIG. 5 may be interpreted to be a hypothesized cooccurrence relation or alternatively the words may be collected for every category code to thereby abstract the hypothesized cooccurrence relations. By way of example, when each row itself is considered to represent a hypothesized cooccurrence relation, as first mentioned above, the cooccurrence relation "KAZE WO HIKU in Japanese (CATCH COLD in English)" applies semantically valid. In that case, assuming that a sentence "KAZE WO TABERU in Japanese (EAT COLD in English)" is inputted, the input sentence is determined to be erroneous because this sort of sentence is not contained in the cooccurrence relation lexicon 9. On the other hand, when "hypothesized cooccurrence relations are to be abstracted", a hierarchical structure (thesaurus) is established among words, wherein the category codes (which may also be considered to be semantic codes) of the words are stored in the analysis/generation lexicon file 5 at the addresses of the respective words to allow the hypothesized cooccurrence relations to be written by using a word of super concept (i.e. category codes) in the hierarchical structure. In this way, the individual hypothesis can be abstracted into a high-rank hypothesis. For example, hypothesized cooccurrence relations "KOME WO HIKU in Japanese (GRIND RICE in English)" and "MAME WO HIKU in Japanese (GRIND BEANS in English)" can be abstracted or combined into a high-rank hypothesized cooccurrence relation "KOKUMOTSU WO HIKU in Japanese (GRIND GRAIN in English)". In this connection, it is preferred that "GRAIN" does not serve as the word but functions as the category code.

When another interpretation (i.e. generation of another hypothesized cooccurrence relation) is possible (step 106), this hypothesis is generated (step 107) and decision is again made as to whether this hypothesized cooccurrence relation is to be registered in the cooccurrence relation lexicon 9 (step 105).

Now assuming that a hypothesized cooccurrence relation under consideration is determined to be registered in the cooccurrence relation lexicon 9 (step 105), it is then checked whether the same cooccurrence relation has already been registered in the lexicon 9 or whether a registered cooccurrence relation which corresponds to a super concept or subconcept of the relation now under consideration is present or not (step 109). If such a relation is absent, the hypothesized cooccurrence relation under consideration is registered (step 110). On the other hand, when the same hypothesized cooccurrence relation is present and when data of the frequency of appearance and probability has also been stored in the cooccurrence relation lexicon 9, the value of data is updated. When only a pattern is allowed to be registered, no registration is made. When the equivalent cooccurrence relation has been registered in a super concept or in a subconcept, the cooccurrence relation under consideration and the registered cooccurrence relation can be abstracted or combined into the cooccurrence relation of the super concept or alternatively both can be registered as a special case (step 111). In reality, it depends on the design concept of the syntactic analysis/generation system as to which registration method is to be selected.

When the cooccurrence relation lexicon 9 is considered to be a conventional data base, there arises a fear that data contradicting the existing data might be registered. For example, it is assumed that a cooccurrence relation "TORI WA TOBU in Japanese (BIRDS FLY in English)" and "TSUBAME WA TOBU in Japanese (SWALLOWS FLY in English)" have been registered. Based on this assumption, when a sentence "TONDEIRU PENGIN NO HANE in Japanese (FLYING PENGUIN'S FEATHER in English)" is inputted, then the word which "FLYING" modifies may possibly be regarded as "PENGUIN" which is a "BIRD", whereby a sentence "PENGUIN FLIES" which is apparently unnatural may be generated. In such a case, the processing system can prompt the user to discard the cooccurrence relation "BIRDS FLY" or alternatively register a cooccurrence relation "BIRDS EXCEPT FOR PENGUIN AND OSTRICH FLY" as the restricting condition descriptors. However, in view of the possibility of generation of an erroneous cooccurrence relation, it is not preferred to derive the conditional cooccurrence relation only from the interpretation of the textual sentences. In other words, it is desirable to generate the cooccurrence relations only for affirmative sentences and exclude those for negative sentences. More specifically, a sentence "THIS DOVE IS INJURED AND CAN NOT FLY" might allow a sentence "A DOVE CAN NOT FLY" to be derived. To prevent this, a restricting condition "EXCEPT FOR DOVE" will have to be unnaturally imposed to the first mentioned cooccurrence relation. Such undesirable possibility could be suppressed if an enormous number (e.g. several ten millions or more) of textual sentences were available in the text corpus file 8. Under the circumstances, in order to make the system of the instant embodiment work effectively with the text corpus file 8 of the capacity mentioned hereinbefore, it is preferred not to generate or derive the cooccurrence relation from the restrictively conditional cooccurrence relation e.g. a temporal sentence "THIS DOVE CAN NOT FLY" and the negative sentence. Turning to the aforementioned example, when the sentence "FLYING PENGUIN'S FEATHER" is to be protected against the erroneous parsing at any rate, two cooccurrence relations "BIRDS FLY" and "PENGUIN DOES NOT FLY" are both registered. Upon parsing, the cooccurrence relation having a term at which the word "PENGUIN" of low rank in the conceptual hierarchy (i.e. "PENGUIN DOES NOT FLY) is imparted with preference (or high priority), as a result of which a lexicon capable of functioning as the data source for the parsing can be prepared even if the lexicon inlcudes contradiction when used as the data base.

When the cooccurrence relation in concern can be neither registered nor interpreted in another way, it is checked if other hypothesized cooccurrence correlation is present (step 108). If so, the test of this hypothesis is performed (step 102). Further, in the case where a new hypothesized cooccurrence relation is to be created from that of super concept or subconcept and registered in the cooccurrence relation lexicon 9, the test of the hypothesis is also regained when it is decided that the new cooccurrence relation can not be obtained through abstraction of the cooccurrence relations entered in the rows of the table shown in FIG. 5 and thus the whole text corpus file 8 should preferably be examined again. The processing comes to an end when new hypothesized cooccurrence relation makes appearance no more. It should be noted that the user can interactively participate in the execution of the pattern selection step 101 and the decision steps 105, 106, 108 and 109.

Figure 6:
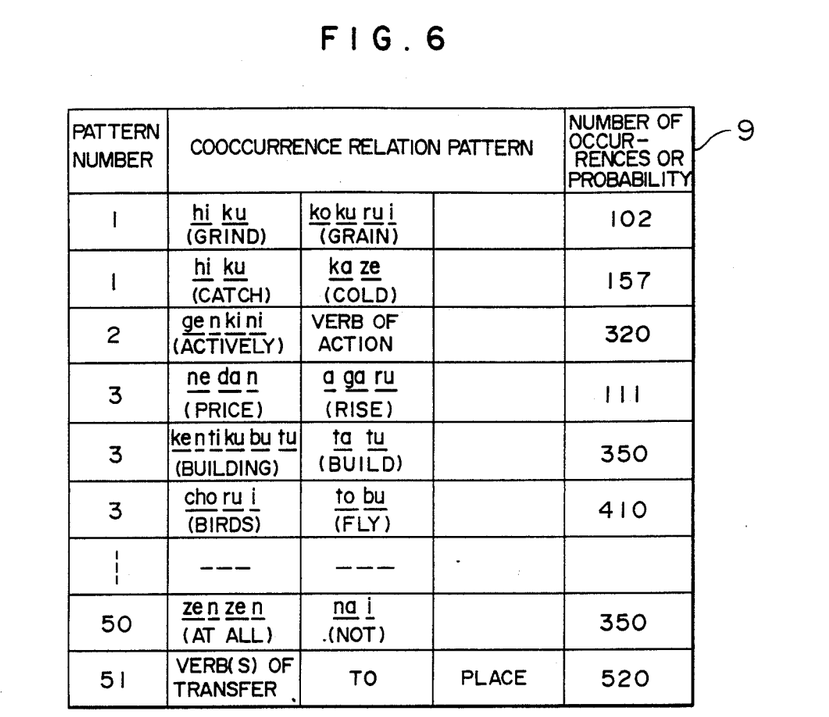
FIG. 6 is a view showing an example of the contents of a cooccurrence relation lexicon generated according to an embodiment of the present invention.

FIG. 6 is a view showing an example of contents of the cooccurrence relation lexicon prepared according to the illustrated embodiment. The cooccurrence relation lexicon 9 can be obtained by executing the processing program 41 shown in FIG. 3 by the CPU 3 shown in FIG. 2.

The cooccurrence relation lexicon 9 includes pattern numbers, cooccurrence relation patterns, and the number of occurrences (or probability). In FIG. 6, the pattern number 1 indicates that the identified cooccurrence relation is a pattern composed of a verb and an object. Similarly, the pattern number 2 indicates a cooccurrence relation pattern composed of an adverb and a verb, the pattern number 3 indicates a cooccurrence relation pattern composed of a subject and a governor (verb), the pattern number 50 indicates a cooccurrence relation pattern composed of an adverb and a jodoshi-gobi (auxiliary suffix in Japanese), and the pattern number 51 indicates a cooccurrence relation pattern composed of a verb, a preposition and a prepositional complement (peculiar to Europo-American languages). The occurrence number or probability indicates the number of times the associated cooccurrence relation pattern appears in the text corpus file.

As will now be appreciated, according to the invention, a laborious procedure for hypothesizing the cooccurrence relations which are probably required upon parsing of a natural language and machine translation, preparing data for the cooccurrence relations by manually consulting textual sentences and testing the relations, as required in the case of the hitherto known techniques, can be reduced significantly by virtue of such arrangement that once the internal language for the syntactic analysis/generation has been determined, the cooccurrence relation lexicon can be automatically created and maintained by extracting automatically the cooccurrence relations considered to be necessary and adding new textual sentences regardless of alteration of the internal language. Further, the cooccurrence relations which are regarded as unnecessary can be prevented from generation to thereby enhance the efficiency correspondingly. In such a case, the cooccurrence relation lexicon can be prepared for the range of cooccurrence relations which can be checked without omission. Although the foregoing description has been made on the assumption that the illustrated embodiment is applied primarily for extracting the cooccurrence relations for parsing Japanese sentences and for extracting the cooccurrence relations to be utilized in generating Japanese sentences in the English-Japanese machine translation, it will be understood that the teachings of the invention can equally be applied to the parsing of an English sentence as well as extraction of the cooccurrence relation in a natural language or paired language other than English and Japanese.

We claim:

1. A method, using a computer including a processor and a memory, of generating cooccurrence relation information indicating whether a sequence of words in a given sentence described in a natural language is semantically correct or not, said method comprising the steps of:
   (a) defining categories of sentences on the basis of the types of documents in which the sentences appear;

(b) defining fields of sentences on the basis of the subject matters of the sentences;

(c) preparing a text corpus by collecting input textual sentences belonging to the same category or the same field as the given sentence;

(d) preparing a cooccurrence relation table containing grammar or a set of grammatical rules for analyzing the textual sentences of the text corpus to permit determining a cooccurrence relation between words in the textual sentences;

(e) determining a hypothesized cooccurrence relation between words in the sequence of words in the given sentence on the basis of a cooccurrence relation from said cooccurrence relation table, the hypothesized cooccurrence relation indicating a particular possible concurrence relation between words in the given sentence;

(f) deriving an actual cooccurrence relation between words in the sequence of words in the given sentence from the determined hypothesized cooccurrence relation;

(g) determining whether the actual cooccurrence relation exceeds a predetermined threshold condition for a valid cooccurrence relation; and (h) when the actual cooccurrence relation exceeds the predetermined threshold condition, outputting information indicating the actual cooccurrence relation as a valid cooccurrence relation.

2. A method of generating cooccurrence relation information according to claim 1, wherein steps (e) and (f) are automatically executed in accordance with a predetermined processing program.

3. A method of generating cooccurrence relation information according to claim 1, wherein steps (e) and (f) are executed in accordance with a processing program which interacts with a display device adapted for displaying the cooccurrence relation information and an information input device.

4. A method of generating cooccurrence relation information according to claim 1, further comprising the step of inputting information of the valid cooccurrence relation into a cooccurrence relation lexicon in accordance with predetermined conditions for inclusion in said lexicon.

5. A method of generating cooccurrence relation information according to claim 1, wherein the outputted information includes first data concerning the valid cooccurrence relation and second data representative of a combination of words for which the cooccurrence relation is valid.

6. A method, using a computer including a processor and a memory, of automatically generating and maintaining a cooccurrence relation lexicon storing cooccurrence relation information indicating whether a sequence of words in a given sentence described in a natural language is semantically correct or not, said method comprising the steps of:

(a) storing in said memory a processing program for generating or maintaining said cooccurrence relation lexicon and a table containing hypothesized cooccurrence relations of high probability;

(b) defining categories of sentences on the basis of the types of documents in which the sentences appear;

(c) defining fields of sentences on the basis of the subject matters of the sentences;

(d) preparing a text corpus file by collecting input textual sentences belonging to the same category or the same field as the given sentence;

(e) determining a hypothesized cooccurrence relation between words in the sequence of words in the given sentence on the basis of a cooccurrence relation from said hypothesized cooccurrence relation table, the hypothesized cooccurrence relation indicating a particular possible cooccurrence relation between words in the given sentence;

(f) deriving from said text corpus file actual textual sentences relevant to terms contained in the most recently determined hypothesized cooccurrence relation, analyzing the derived actual textual sentences, and storing the result of the analysis in said memory;

(g) determining whether the result of the analysis indicates that information having the most recently determined hypothesized cooccurrence relation meets predetermined threshold conditions;

(h) when the result of the analysis indicates that the information having the most recently determined hypothesized cooccurrence relation meets the predetermined threshold conditions, including the most recently determined hypothesized cooccurrence relation in said lexicon unless data of cooccurrence relations corresponding to a super-concept or a subconcept of the most recently determined hypothesized cooccurrence relation are present in said lexicon, and examining the probability of determining another hypothesized cooccurrence relation;

(i) when the result of the analysis indicates that the information having the most recently determined hypothesized cooccurrence relation does not meet the predetermined threshold conditions, examining the probability of determining a further hypothesized cooccurrence relation;

(j) when the result of the most recent analysis indicates that the possible further hypothesized cooccurrence relation does not meet the predetermined threshold conditions, examining the probability of determining a still further hypothesized cooccurrence relation; and (k) when a probability of establishing a further hypothesized cooccurrence relation is found in step (h), (i), or (j), re-executing the method commencing with step (e).

7. A method according to claim 6, wherein step (g) includes reading out data of the cooccurrence relation registered in said lexicon and deleting or modifying the read out data unless the predetermined threshold conditions are met by the readout data.

8. A method according to claim 6, wherein step (d) includes updating said text corpus file periodically.

9. A system for generating cooccurrence relation information indicating whether a sequence of words in a given sentence described in a natural language is semantically correct or not, wherein the given sentence is defined as within a particular one of a plurality of sentence categories on the basis of the type of document in which the given sentence appears and is defined as within a particular one of a plurality of sentence fields on the basis of the subject matter of the given sentence, said system comprising:

a text corpus file including textual sentences belonging to the same category or the same field as the given sentence;

a cooccurrence relation table containing grammar or a set of grammatical rules for analyzing the textual sentences of said text corpus file to permit determining a cooccurrence relation between words in the textual sentences;

a memory including an area for storing a hypothesized cooccurrence relation table listing hypothesized cooccurrence relations having a high probability of valid cooccurrence relations and an area for storing a processing program for executing algorithms for automatically generating and maintaining a cooccurrence relation lexicon;

means for determining hypothesized cooccurrence relations between words of the sequence of words in the given sentence on the basis of cooccurrence relation patterns, indicative of high probability of a particular cooccurrence relation extracted from said hypothesized cooccurrence relation table in accordance with a processing program stored in said memory; and testing means for responding to hypothesized cooccurrence relations determined by said determining means to derive textual sentences having relevant actual cooccurrence relation patterns from said text corpus file and for analyzing each of the derived textual sentences with the aid of sentence analysis or generation rules and a sentence analysis or generation lexicon, said testing means including means for examining whether the result of the analysis indicates that the derived textual sentences meet predetermined threshold conditions for a valid cooccurrence relation and means for outputting information indicating the valid cooccurrence relation.

10. A system according to claim 9, further comprising registration control means for comparing the valid cooccurrence relation information from said testing means with a predetermined condition, and means responsive to the valid cooccurrence relation information meeting the predetermined condition for modifying the contents of said cooccurrence relation lexicon.

11. A method, using a computer including a processor and a memory, of generating cooccurrence relation information indicating whether a sequence of words in a given sentence described in a natural language is semantically correct or not, said method comprising the steps of:
 (a) defining categories of sentences on the basis of the types of documents in which the sentences appear;
 (b) defining fields of sentences on the basis of the subject matters of the sentences;
 (c) preparing a text corpus by collecting input textual sentences belonging to the same category or the same field as the given sentence;
 (d) determining a hypothesized cooccurrence relation between words in the sequence of words in the given sentence on the basis of a cooccurrence relation pattern set up by an operator and indicating a particular possible cooccurrence relation between words in the the given sentence;
 (e) deriving an actual cooccurrence relation between words in the sequence of words in the given sentence from said text corpus for the determined hypothesized cooccurrence relation;
 (f) determining whether the actual cooccurrence relation exceeds a predetermined threshold condition for a valid cooccurrence relation; and
 (g) when the actual cooccurrence relation exceeds the predetermined threshold condition, outputting information indicating the actual cooccurrence relation as a valid cooccurrence relation.

12. A method of generating cooccurrence relation information according to claim 11, wherein step (d) determines a hypothesized cooccurrence relation directly by the operator.

13. A method of generating cooccurrence relation information according to claim 6 wherein step (a) comprises storing in said memory a processing program for generating and maintaining said cooccurrence relation lexicon.

* * * * *